(12) United States Patent
Mann

(10) Patent No.: US 7,428,885 B2
(45) Date of Patent: Sep. 30, 2008

(54) ROTARY ENGINE EMPLOYING UNDULATING RAMP DRIVEN BY PAIRED RECIPROCATING PISTONS

(75) Inventor: Ian Mann, Camarillo, CA (US)

(73) Assignee: Advanced Engine Technologies, Inc., Los Angeles, CA (US)

( * ) Notice: Subject to any disclaimer, the term of this patent is extended or adjusted under 35 U.S.C. 154(b) by 109 days.

(21) Appl. No.: 11/332,684

(22) Filed: Jan. 12, 2006

(65) Prior Publication Data

US 2006/0283407 A1    Dec. 21, 2006

Related U.S. Application Data

(60) Provisional application No. 60/644,215, filed on Jan. 13, 2005.

(51) Int. Cl.
*F02B 53/00* (2006.01)
*F02B 57/00* (2006.01)

(52) U.S. Cl. .............................. 123/43 A; 123/43 AA; 123/43 C; 123/45 R

(58) Field of Classification Search ............... 123/43 A, 123/43 AA, 43 R, 44 R, 44 B, 44 E, 45 R
See application file for complete search history.

(56) References Cited

U.S. PATENT DOCUMENTS

| 3,220,390 | A | * | 11/1965 | Combee | ................... 123/44 C |
| 5,722,361 | A | * | 3/1998 | Sabet et al. | .................. 123/205 |
| 5,813,372 | A | | 9/1998 | Manthey | |
| 6,155,214 | A | | 12/2000 | Manthey | |
| 6,270,322 | B1 | * | 8/2001 | Hoyt | ........................... 417/355 |
| 6,601,547 | B2 | * | 8/2003 | Al-Hawaj | .................. 123/56.1 |

* cited by examiner

*Primary Examiner*—Hoang M Nguyen
(74) *Attorney, Agent, or Firm*—Edward A. Sokolski

(57) ABSTRACT

A rotary gasoline engine has two sets of pistons, which move reciprocally. The reciprocal output of said pistons is coupled to an undulating ramp, which converts the reciprocal motion to rotary motion. The engine casing has a hollow center though which no shaft runs. Dual rotary outputs are provided, one through a rotatable output block at the top end of the casing, the other through a rotatable block at the bottom end of the casing in response to the reciprocal motion of the pistons.

20 Claims, 6 Drawing Sheets

ROTARY ENGINE EMPLOYING UNDULATING RAMP DRIVEN BY PAIRED RECIPROCATING PISTONS

This application enjoys the priority of Provisional Application No. 60/644,215 filed Jan. 13, 2005.

BACKGROUND OF THE INVENTION

1. Field of the Invention

This invention relates to a rotary gasoline engine and more particularly to such an engine having dual rotary outputs at the opposite ends of the engine.

2. Description of the Related Art

Conventional gasoline engines generally transfer the reciprocating force of the engine pistons through a crankshaft to a flywheel, which is coupled to the shaft. In U.S. Pat. No. 5,813,372 issued Sep. 29, 1998 to Manthey and assigned to Advanced Engine Technology, the assignee of the present invention, an improved piston drive system is described in which pairs of reciprocating pistons are mounted in a casing and operating in unison drive against a fixed undulated cam track to effect rotational motion of the pistons. This rotational motion is transferred to a block member to which the drive shaft is attached. This approach to engine design has been found to have fewer components, is simpler, lighter in weight, and of construction that is more economical. This type of engine is particularly suitable for driving systems, which do not have very high speeds such as electrical power generating systems.

SUMMARY OF THE INVENTION

The present invention as in the device of the '372 patent employs an undulating ramp which converts the reciprocal motion of the engine to rotational motion. The device of the present invention is an improvement over the device of the '372 patent in that it is simpler in construction and eliminates the positioning of the engine drive shaft within the engine casing. This allows considerably more space in the casing for other components and makes for a simpler, lighter and more economical engine. Additionally a second output drive is provided on the opposite end of the engine casing from the first drive thereby allowing the output drive to be taken from either end of the casing or from both ends in a suitable fashion such as by drive shafts connected to the output drives This is implemented by an engine cylinder in which the combustion chamber is contained and a first rotary block which provides a first rotary output at the top end of the engine casing and a second rotary block connected to the first rotary block which provides a rotational output at the bottom end of the engine casing,

DETAILED DESCRIPTION OF THE INVENTION

Figure 1:
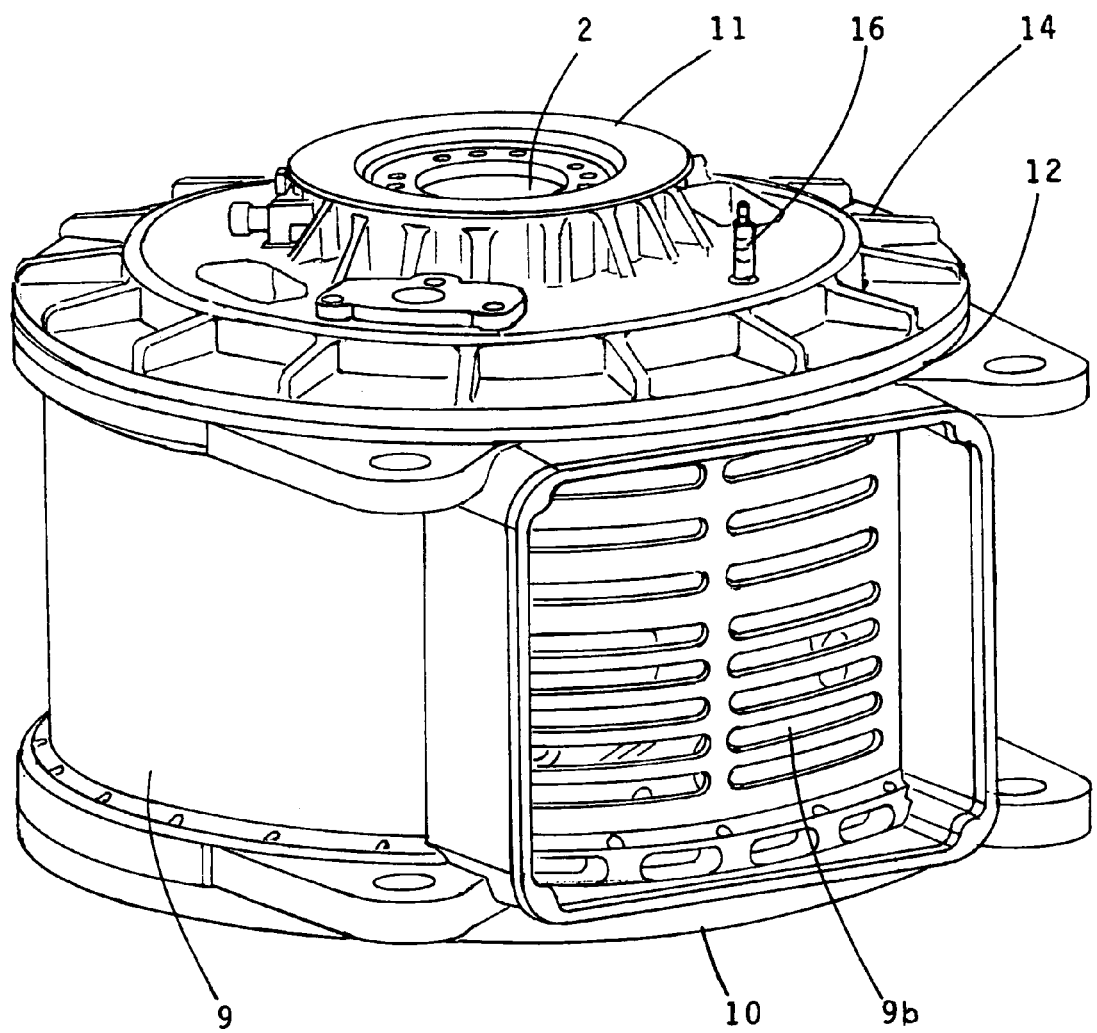
FIG. 1 is a side perspective view of a preferred embodiment of the invention.
Figure 2:
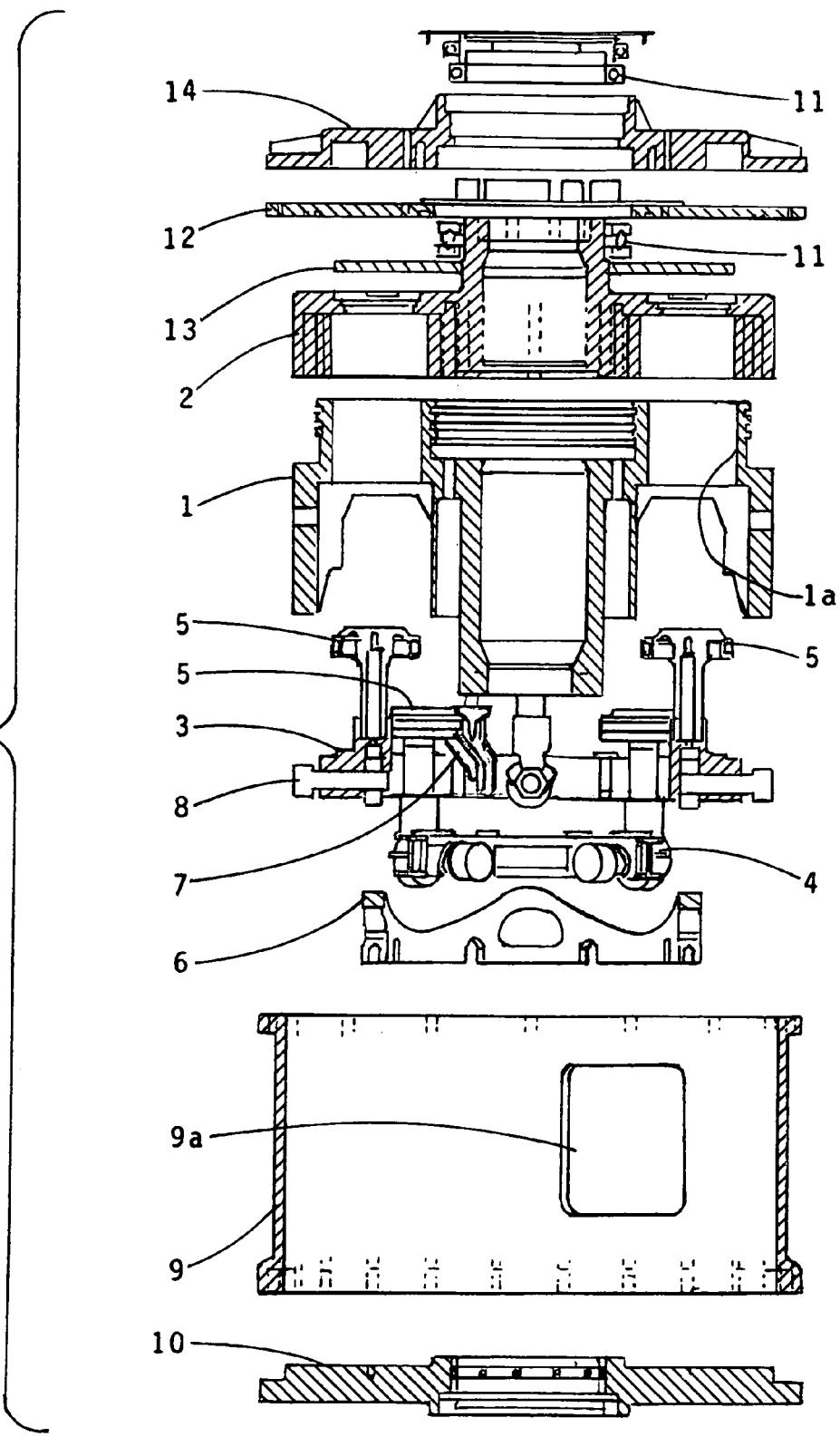
FIG. 2 is a front cross-sectional exploded view in perspective of the preferred embodiment.
Figure 3:
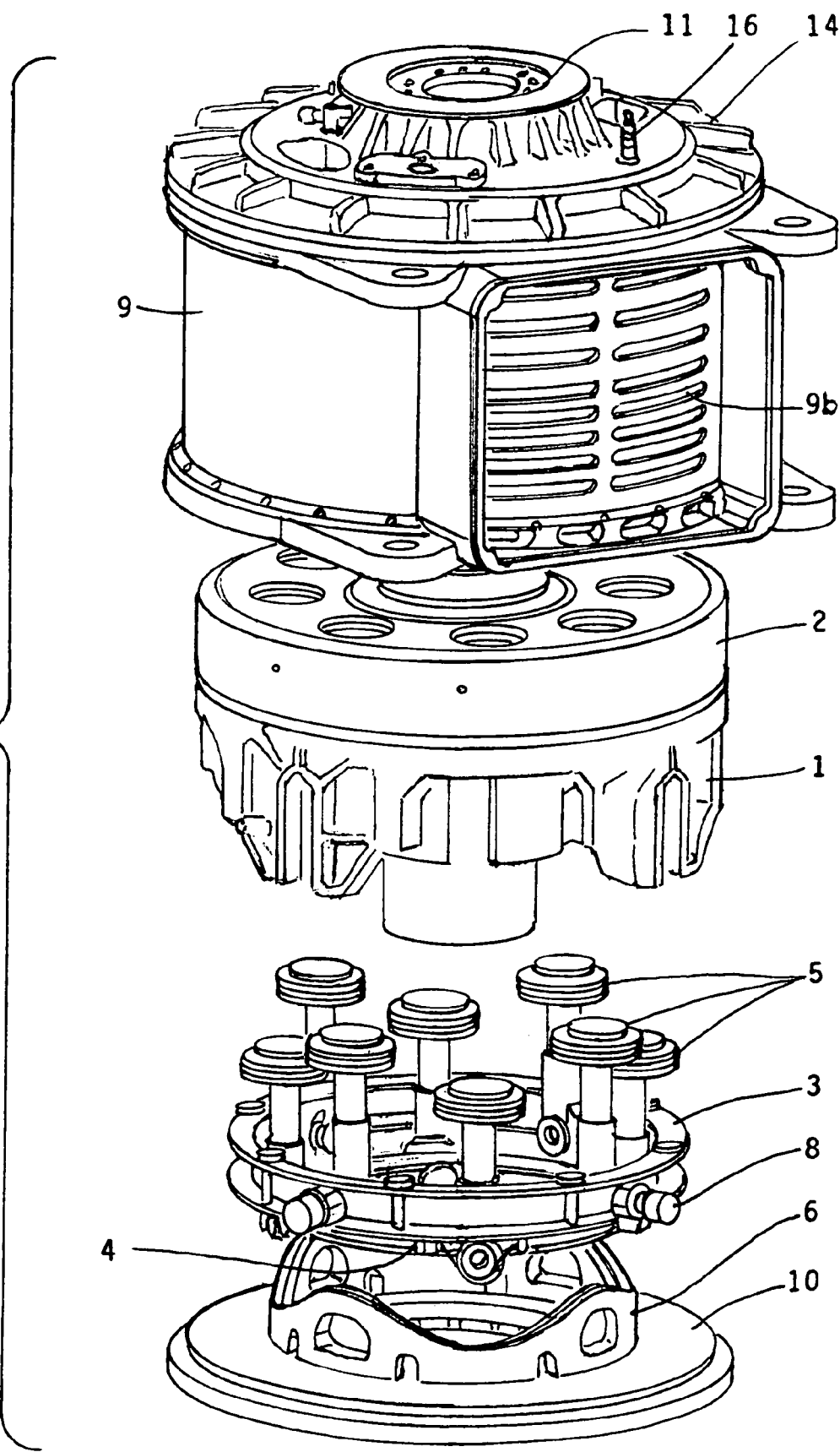
FIG. 3 is a front exploded view in perspective of the preferred embodiment.
Figure 4:
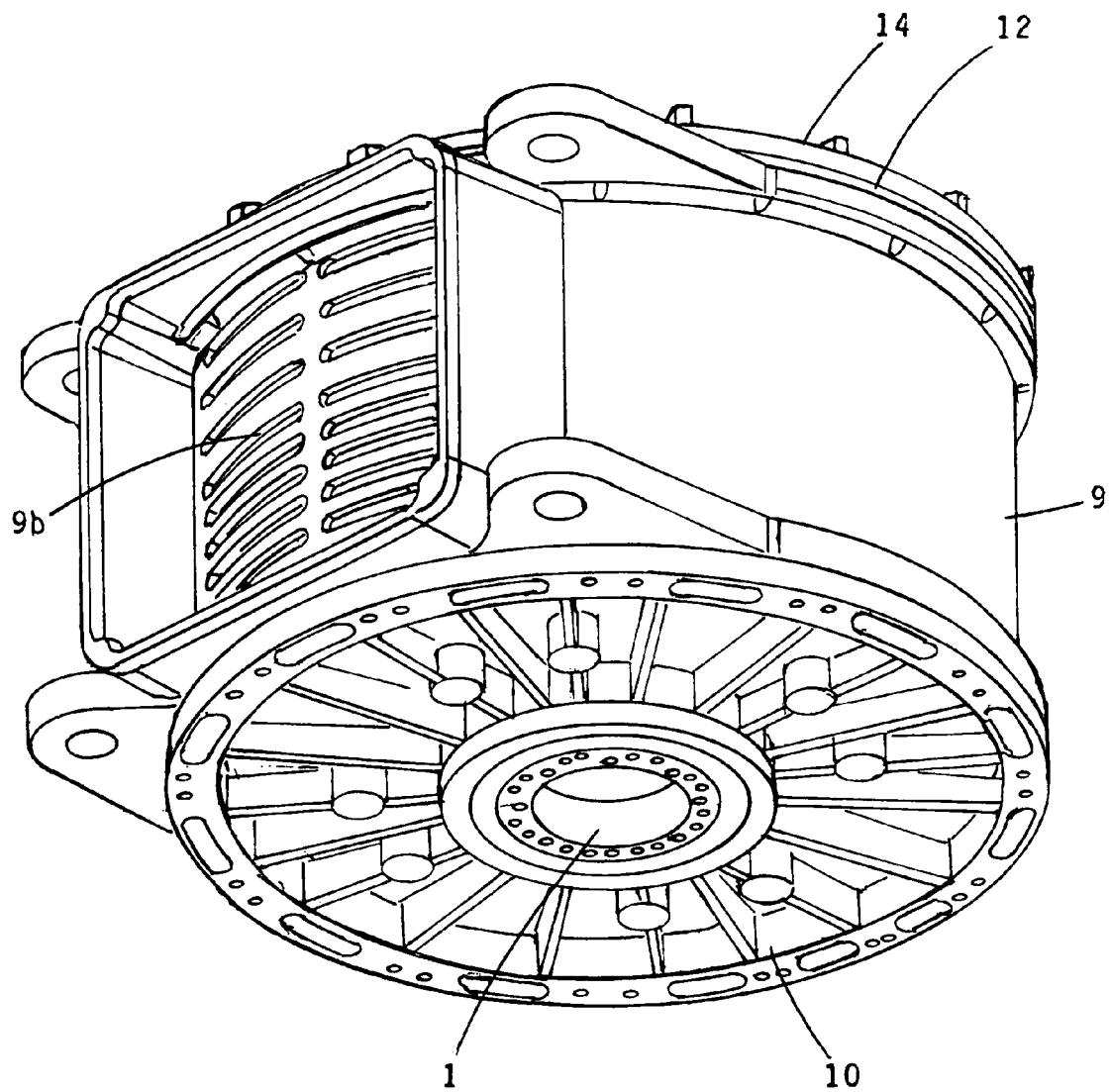
FIG. 4 a side perspective view of the preferred embodiment showing the bottom end portion.
Figure 5:
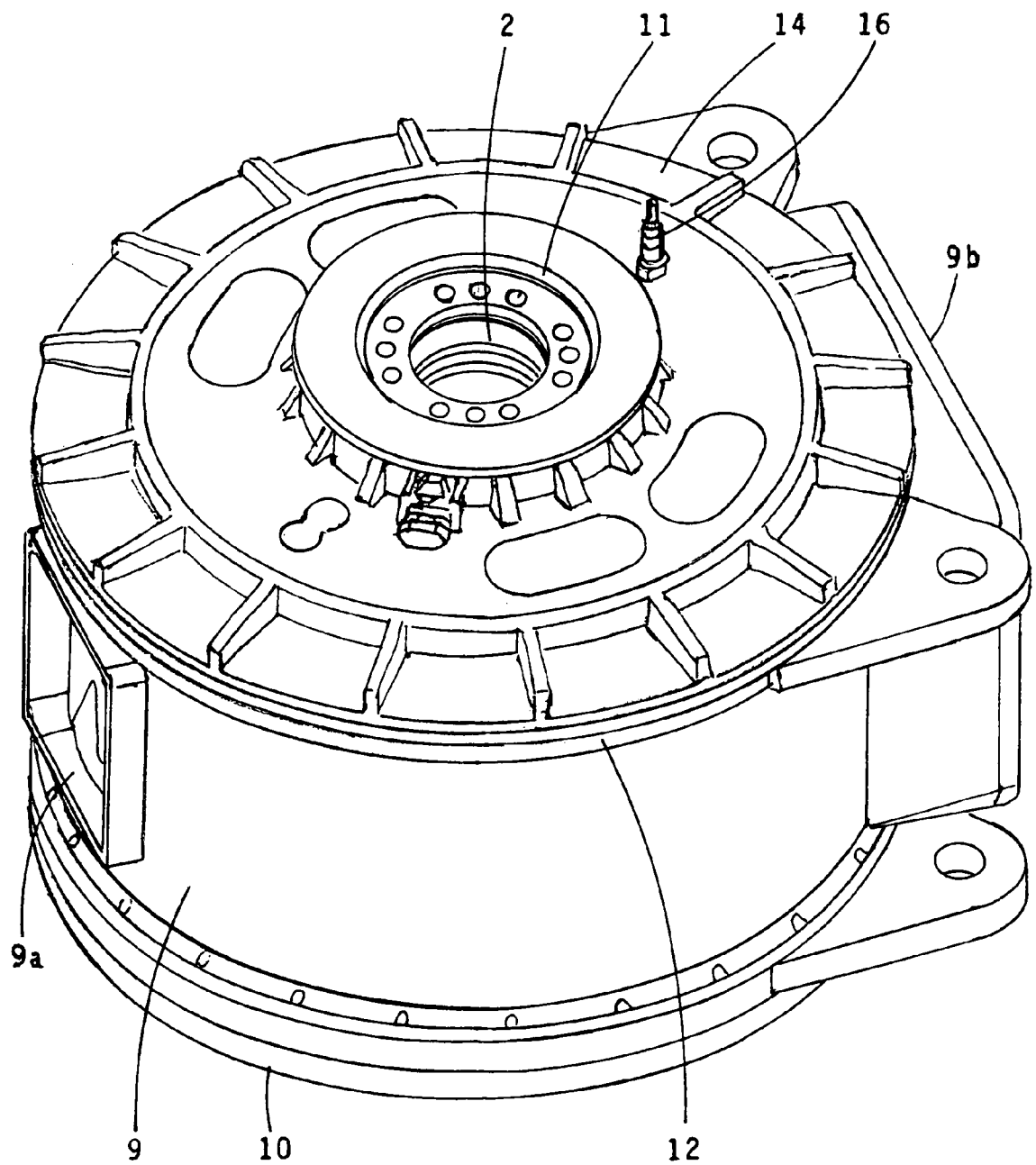
FIG. 5 a side perspective view of the preferred embodiment showing the top end portion.
Figure 6:
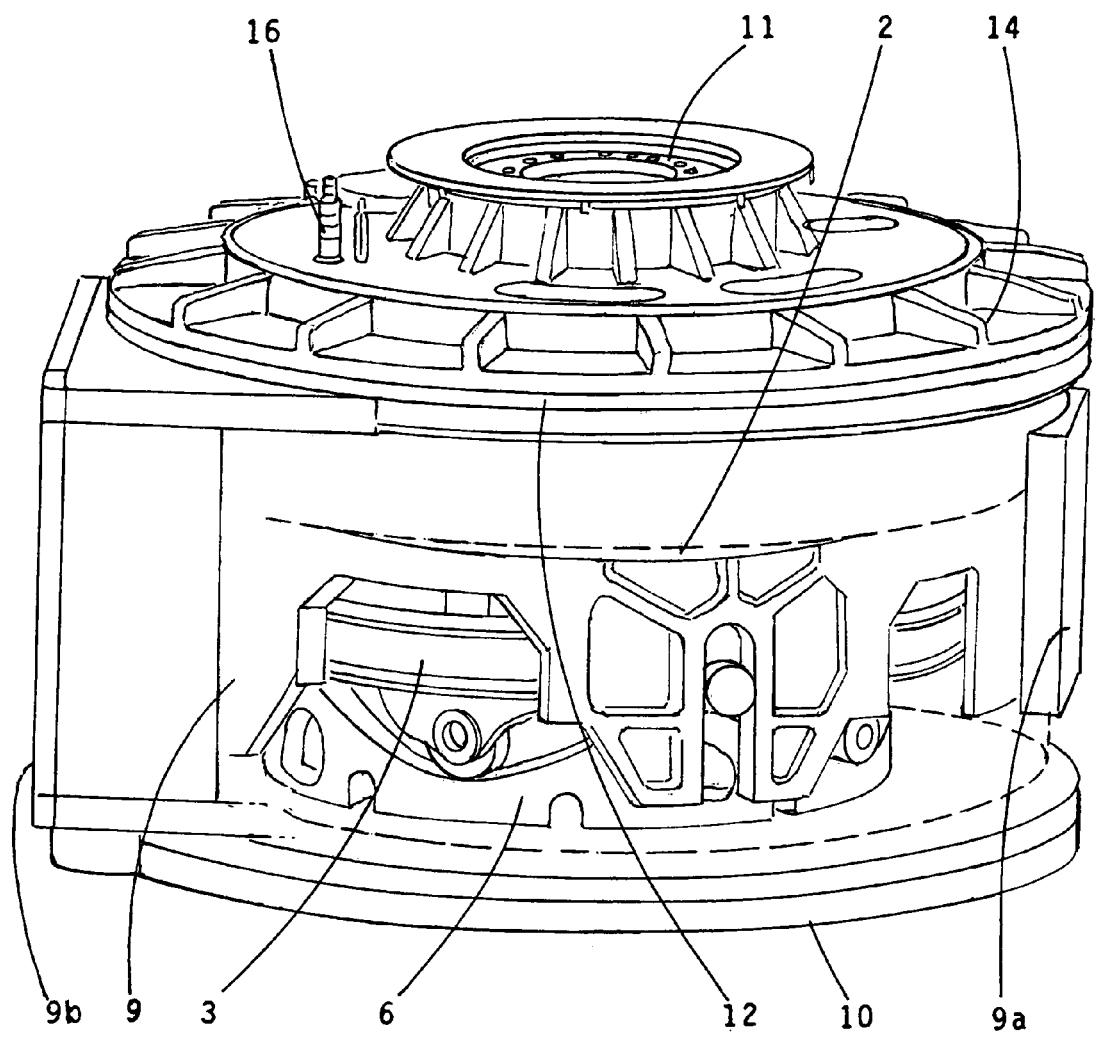
FIG. 6 a side perspective view of the preferred embodiment with a cut-away portion.

Referring to the Figures, the device of the preferred embodiment of the invention is as follows:

Casing 9 is the main external casing of the engine and encases inner blocks 1 and 2. Plate 10 is mounted on the bottom end of the casing and wear plate 12 and plate 14 on the top end. A window 9a is formed in the side of the casing to enable the observation of the parts in the casing and facilitate the inspection and measurement of the parts and their clearances without the need to disassemble the engine. Oil pan 9b is located beneath this window.

Inner blocks 1 and 2 are attached together and form the heart of the rotating inner assembly. Block 1 has the cylinder walls 1a for all of the pistons and is rotatably driven along with block 2 by torsional roller bearings 8. These bearings are attached to piston plates 3 and 4 and fix the angular relationship between the piston plates and block 1. These bearings also transmit the torque produced by the piston plates 3 and 4 to block 1. Outer piston plate 3 supports four pistons 5 and travels along fixedly supported ramp 6 which has an undulated surface. The piston plate 3 produces a torsional force as the pistons 5 are forced down and the piston plate is forced against undulated ramp 6. Undulated ramp 6 is fixed to plate 10 and provides undulating motion to piston plates 3 and 4 as they move up and down. This converts the up and down motion of the pistons to rotary motion. The rotational torsional force produced by piston plate 3 is transmitted to block 1 through torsional roller bearings 8 thereby providing the driving power to the engine drive shafts 19 and 20. Piston plate 4(inner plate) operates in the same manner as piston plate 3(outer plate) but is smaller in diameter. The two piston plates are concentric but move up and down in opposite directions, i.e. when one is moving up the other is moving down. Rocker 7 is attached to block 1 and contacts piston plates 3 and 4. The rocker limits the travel of the piston plates and aids in keeping them in contact with ramp 6.

Block 2 extends to the top of the casing 9 (outer block) and provides the upper end rotational drive output for an engine drive shaft. Block 2 also closes the top of the cylinders, supports the port seals 13 and attaches to the support bearings 11. Seals 13 rotate with block 2 and press against wear plate 12 to form a seal for the top of the combustion chamber. The seals also provide an access port between the spark plugs, intake port and exhaust port. These seals preferably incorporate a tapered combustion face to allow the higher combustion pressure to press the seals against the wear plate 12 with a greater force during combustion.

Wear plate 12 is positioned between plate 14 and the top of casing 9. The wear plate is just above block 2 against which the seals 13 rub as block 1 rotates. The wear plate is at the location of the spark plugs 16 and portions of the intake and exhaust ports.

Plate 14 is attached to the top of the casing 9 in abutment against wear plate 12. Plate 14 also holds the front bearing support 11. This bearing support radially supports block 2. The water cooling jacket and the intake and exhaust ports of the engine are located at the plate. 14. A secondary output drive of the engine is provided at the top of casing 9 through an opening in plate 14. This output is provided to an end portion of block 2 which is accessible through this opening.

The main output of the engine is taken from block 1 which has an end portion which is accessible through an aperture formed in plate 10. Plate 10 is attached to the bottom end of casing 9 while plate 14 is attached to the top of the casing. As can be seen, there is no drive shaft running through casing 9.

The device of the present invention has several features not found in the prior art. These include the provision of a hollow central portion without any drive shaft running through, substantially reduced weight, the provision of outputs from both ends of the engine casing and the elimination of the need for internal water cooling.

While the device of the invention has been described and illustrated in detail, this is not intended by way of limitation, the spirit and scope of the invention being determined by the following claims.

I claim:

1. A rotary internal combustion engine comprising:
   a casing;
   associated cylinders;
   a first set of pistons operatively connected to a first piston plate and disposed in said associated cylinders for reciprocal motion;
   a second set of pistons operatively connected to a second piston plate and disposed in said associated cylinders for reciprocal motion;
   an undulating ramp to provide undulating motion to said first and second piston plates to convert and down motion of said first and second set of pistons to rotary motion;
   first and second engine drive shafts positioned on opposite ends of said casing, respectively;
   a first output block rotatably supported in said casing and providing a first rotary output through the top end of said casing in response to the reciprocal motion of said first set of pistons converted to rotary motion, said first rotary output being fed to said first engine shaft; and
   a second output block attached to said first output block and thereby rotatably supported in said casing and providing a second rotary output through the bottom end of said casing in response to the reciprocal motion of said second set of pistons converted to rotary motion, the second rotary output being fed to said second engine drive shaft.

2. The engine of claim 1 wherein said first and second piston plates are operatively connected concentric to one another.

3. The engine of claim 2 wherein said first and second piston plates are operatively connected to move up and down in opposite directions relative to one another.

4. The engine of claim 1 wherein said first and second piston plates are concentrically positioned to one another and operatively connected to move up and down in opposite directions relative to one another.

5. The engine of claim 1 and further including a window formed in a side of the casing to facilitate inspection of inner parts of the engine.

6. The engine of claim 5 wherein said first engine drive shaft and said second engine drive shaft are capable of providing an output drive from the top end or the bottom end or from both the top end and the bottom end.

7. The engine of claim 1 wherein said first piston plate comprises a smaller diameter than that of a diameter of said second piston plate.

8. The engine of claim 1 wherein said undulating ramp comprises a fixed supported ramp which has an undulated surface.

9. In a rotational internal combustion engine mounted in a casing having a combustion chamber comprising:
   an inner piston plate to support a first set of pistons in associated cylinders;
   an outer piston plate disposed about the inner piston plate to support a second set of pistons in the associated cylinders;
   first and second drive shafts positioned on opposite ends of said casing respectively;
   a first output block rotatably supported in said casing and providing a rotary output at the top end of said casing in response to the reciprocal motion of said first set of pistons converted to rotary motion, said rotary output of said first output block being fed to said first drive shaft;
   a plate fixedly mounted on the bottom end of said casing, said undulating ramp being fixedly attached to said plate;
   a second output block rotatably supported in said casing and providing a rotary output at the bottom end of said casing in response to the reciprocal motion of said second set of pistons converted to rotary motion by said undulating ramp, the first and second output blocks being connected to each other, the rotary output of said second block being fed to said second drive shaft;
   a window formed in the side of said casing to facilitate inspection of parts within the casing.

10. The engine of claim 9 wherein said inner piston plate and said outer piston plate are disposed concentrically to one another.

11. The engine of claim 10 wherein said inner piston plate comprises a diameter that is smaller than that of a diameter of said outer piston plate.

12. The engine of claim 9 wherein said undulating ramp comprises an undulated surface that is fixed to a plate and provides undulating motion to said first and said second piston sets as each of said first and said second piston sets move up and down.

13. The engine of claim 9 further comprising a rocker operatively connected to said inner piston plate and said outer piston plate; wherein said rocker limits travel of said inner piston plate and said outer piston plate.

14. The engine of claim 13 wherein said rocker aids in keeping said inner piston plate and said outer piston plate in contact with said undulating ramp.

15. The engine of claim 13 wherein said second output block is configured to close a top of associated cylinders of the first and the second set of pistons.

16. An engine having a combustion chamber comprising:
   a first set of pistons;
   a second set of pistons;
   first and second engine drive shafts positioned on opposite ends of a casing, respectively;
   an inner piston plate configured to support said first set of pistons in associated cylinders and operatively connected therewith, said inner piston plate operatively connected to a first set of torsional roller bearings;
   an outer piston plate disposed substantially concentrically about said inner piston plate to support a second set of pistons in the associated cylinders and operatively connected to move in an opposite direction to motion of said inner piston plate, said outer piston plate having a diameter greater than a diameter of the inner piston plate and operatively connected to a second set of torsional roller bearings;
   an undulating ramp surface to provide undulating motion to said inner and said outer piston plates to convert up and down motion of said first and second set of pistons to rotary motion;

a first output block configured to provide a rotary output at said first engine drive shaft in response to up and down motion of said first set of pistons converted to rotary motion; and a second output block configured to provide a rotary output in response to up and down motion of said second set of pistons converted to rotary motion by said undulating ramp surface, the first and second output blocks being connected to each other, an output of said second block provides said second engine drive shaft.

17. The engine of claim 16 further comprises a wear plate and seals, wherein the seals are configured to rotate with the second output block and press against the wear plate to form a seal for a top of the combustion chamber.

18. The engine of claim 17 wherein the seals provide an access port between spark plugs, intake port, and exhaust port; and wherein said first set and second set of torsional roller bearings fix an angular relation between the inner piston plate and the outer piston plate to said first output block.

19. The engine of claim 16 wherein the seals comprise a tapered combustion face to increase combustion pressure to press the seals against the wear plate with greater force during combustion.

20. The engine of claim 16 further comprising a rocker operatively connected to said first output block and to contact the inner piston plate and the outer piston plate; wherein the rocker limits a travel of said inner piston plate and said outer piston plate and aids in keeping said first piston plate and said second piston plate in contact with said undulating ramp surface.

* * * * *